United States Patent [19]

Bowen, Jr.

[11] 3,843,610
[45] Oct. 22, 1974

[54] POLYMERIZATION PROCESS
[75] Inventor: David Bowen, Jr., Pensacola, Fla.
[73] Assignee: Monsanto Company, St. Louis, Mo.
[22] Filed: Oct. 9, 1968
[21] Appl. No.: 766,192

[52] U.S. Cl................ 260/78 R, 260/37 N, 260/95
[51] Int. Cl............................................ C08g 20/20
[58] Field of Search............................ 260/78, 37 N

[56] References Cited
UNITED STATES PATENTS
2,875,171    2/1959   Foster et al........................... 260/37
2,933,476    4/1960   Fisher.................................. 260/75
3,257,335    6/1966   Whitfield et al..................... 260/2.3
3,300,449    1/1967   Brignae................................ 260/78

Primary Examiner—Harold D. Anderson
Attorney, Agent, or Firm—Kelly O. Corley

[57] ABSTRACT

Pigment agglomerates are filtered out of a partially polymerized reaction mass after most agglomeration has taken place and before the viscosity becomes excessive. This lengthens the service life of the usual spinning filter. Both batch process (autoclave) and continuous polymerizer embodiments are disclosed.

11 Claims, 3 Drawing Figures

INVENTOR.
DAVID BOWEN, JR.
BY
Kelly O. Corley
ATTORNEY

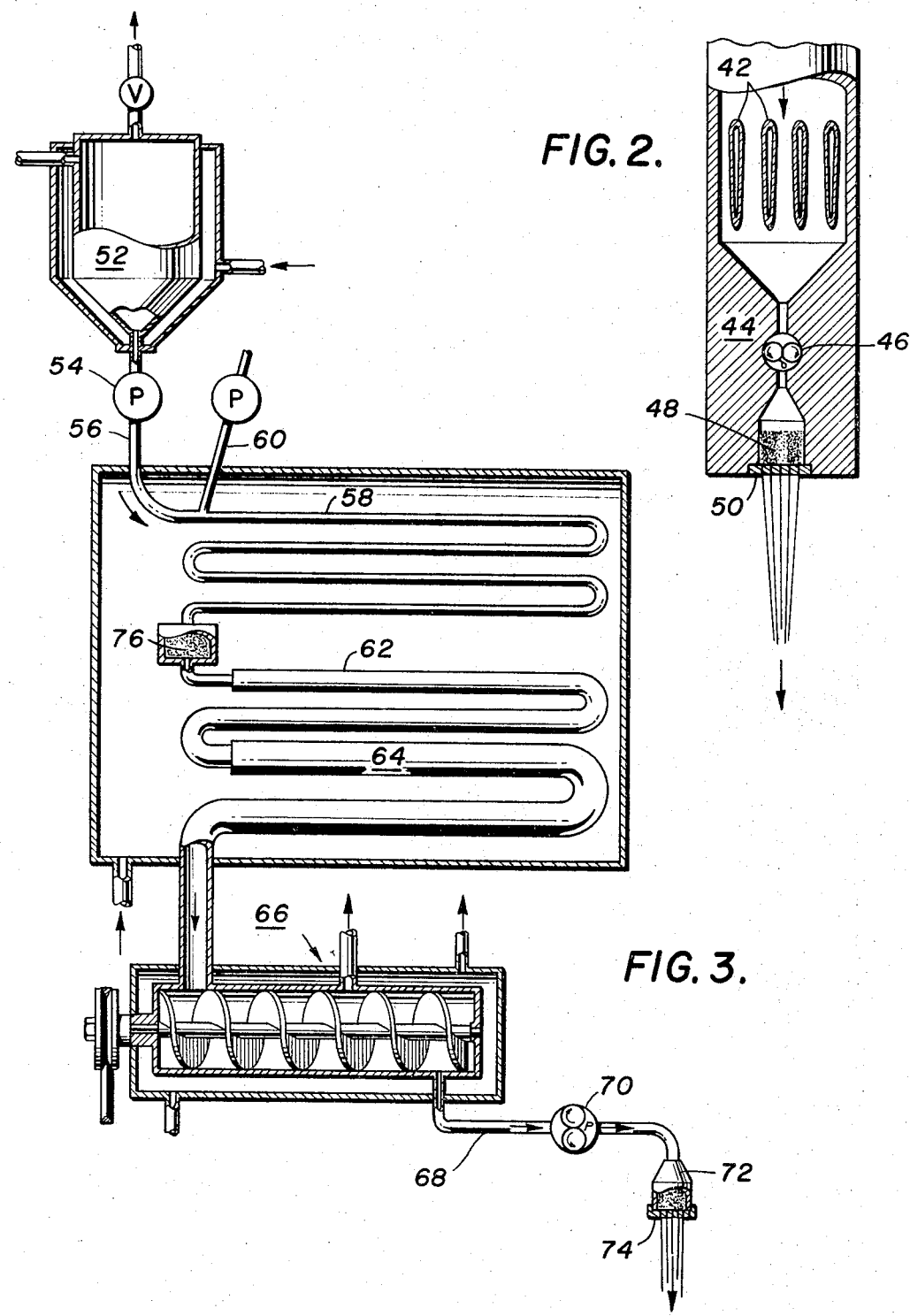

POLYMERIZATION PROCESS

The invention relates to removal from polymer of pigment agglomerates or the like during melt polymerization by filtration at the optimum time. More particularly, this is accomplished by filtering a partially polymerized reaction mass.

Dispersion of finely divided pigment or delusterant (such as titanium dioxide) into polymer has posed a number of problems. The term "pigment" is used herein as including delusterants and other finely divided solid powders. Attempts to blend the finely divided pigment into the finished polymer have generally been unsuccessful because adequate mixing is difficult to achieve in materials of high viscosity. Addition of the pigment to the monomeric reactants has likewise been generally unsatisfactory because of excessive agglomeration of the pigment during the reaction. Hot ionic liquids accelerate agglomeration of the pigment particles, and the resulting agglomerates foul the spinning filter normally provided just before the spinneret, causing short service life for the spinning filter. U.S. Pat. No. 2,278,878 to Hoff discloses in a batch process the injection of finely divided pigment in an aqueous suspension into the boiling reaction mass during the early stages of polymerization when the viscosity is low and a substantial amount of water is present. U.S. Pat. No. 2,689,839 to Heckert discloses a similar procedure in a continuous polymerization polymerization process. The disclosures of the Hoff and Heckert patents are incorporated herein by reference. These prior art processes, while providing substantially improved dispersion of the finely divided pigment into the polymer, still result in substantial amounts of agglomeration of the pigment particles, since the reacting mass in the early stages of polymerization is still hot and quite ionic in character.

It has been discovered that these agglomerates can be most efficiently removed by filtering the polymerization mass before the viscosity of the polymer has exceeded 400 poises, and preferably at considerably lower viscosities. Removal at this time can be achieved with simple equipment at relatively low pumping pressures and with a minimum power consumption, resulting in substantially increased service life for the subsequent final spinning filters.

Accordingly a primary object of the invention is to provide processes for efficiently removing agglomerates of pigment or the like from a polymerizing mass.

A further object is to provide processes of the above character which are applicable to both batch polymerization processes and continuous polymerization processes.

A further object is to provide processes of the above character wherein the agglomerates are removed at the most efficient time.

A further object is to provide a process of the above character wherein the agglomerates are removed with a minimum power consumption.

A further object is to provide a process of the above character wherein minimum modification of existing apparatus is required.

For a more complete understanding of the nature and objects of the invention, reference should be had to the following detailed description taken in connection with the accompanying drawing, in which:

FIG. 2 is a schematic vertical sectional view of a conventional melt spinning apparatus; and FIG. 3 is a schematic elevation view, partially in section, of a continuous polymerizer incorporating the present invention.

Figure 1:
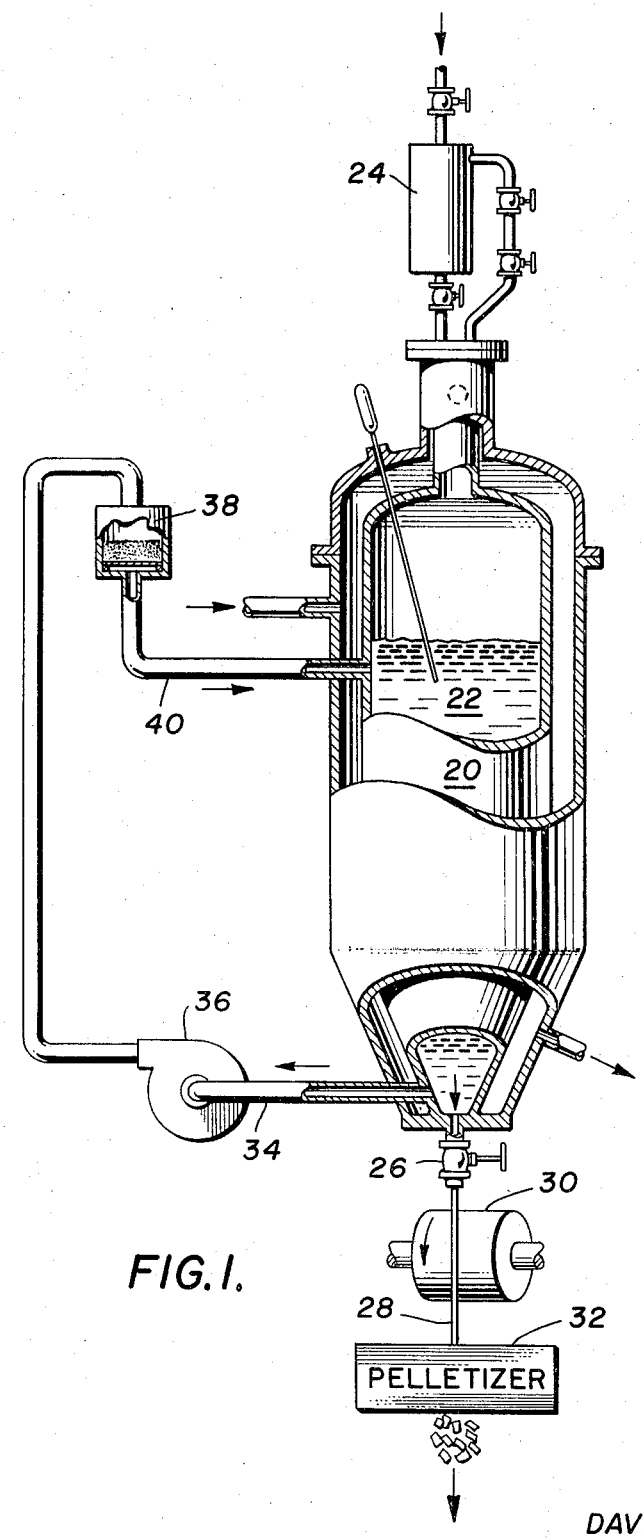
FIG. 1 is a schematic elevation view, partially broken away, of an autoclave incorporating the present invention.

FIG. 1 illustrates the invention as applied to an autoclave 20 of the type more fully disclosed in the Hoff patent noted above, which accordingly will not be described in detail. Briefly, the polymerizable mass 22 is added to autoclave 20 as an aqueous solution of monomeric material, such as hexamethylenediamine adipate. In the autoclave, mass 22 is subjected to a sequence of temperature and pressure conditions for predetermined periods of time until the desired degree of polymerization is achieved. Shortly after mass 22 has begun to boil, pigment suspended in water is added to mass 22 from lock 24, and is rapidly dispersed therein by the turbulence of the mass. After polymerization is completed, valve 26 in the bottom of autoclave 20 is opened and the polymer is extruded downwardly as a molten stream cooled and solidified into ribbon 28 by chilled casting roll 30. The solidified ribbon is next passed through pelletizer 32 and chopped into polymer flake. The apparatus and process as thus far described is conventional, and in the autoclave itself is identical to the apparatus and process disclosed in the above-identified Hoff patent. According to the invention, relatively low viscosity material is withdrawn from autoclave 20 through line 34 by pump 36 and circulated through pre-filter 38 before returning for further polymerization to autoclave 22 through line 40.

The polymer flake produced by pelletizer 32 can then be dried, blended and melt spun, as by the conventional apparatus schematically illustrated in FIG. 2. As shown therein, the flake is fed onto heated grids 42 in block 44 for remelting. The molten polymer falls to a melt pool beneath grids 42. Metering pump 46 in block 44 withdraws the molten polymer and forces it downwardly through spinning filter 48 just prior to extrusion as molten streams through the orifices in spinneret plate 50. A booster or distribution pump preferably precedes the metering pump inlets, as shown in U.S. Pat. No. 2,278,875, to Graves. The molten streams are conventionally cooled and solidified, and collected in an orderly fashion by the usual means (not shown).

The construction of pre-filter 38, similar to spin filter 48, can be conventional in form. Preferably the passages through the filters become progressively smaller in the direction of fluid flow, such as disclosed in U.S. Pat. Nos. 2,266,368 to Hull (a sand filter) or 2,278,875 to Graves (a screen filter). Since the fluid passages downstream in the filter are thus smaller than those upstream, some agglomerates small enough to pass through the relatively large upstream passages will be filtered out by the relatively small downstream passages. The filter accordingly removes increasingly smaller agglomerates in the direction of fluid flow. Other known filter constructions can also be used. Pump 36 is preferably of the positive displacement type, although other pump constructions can be used.

Most of the agglomeration of the pigment occurs in the earliest stages of the polymerization reaction, since mass 22 is at this time highly ionic. As polymerization proceeds and mass 22 becomes less ionic, the viscosity of mass 22 increases and the rate of agglomerate formation decreases. It is therefore advantageous to perform most or all of the pre-filtration soon after the pigment is added and before the viscosity increases to a very high level. With current autoclave cycles, pre-filtration can begin concurrently with or even before addition of the pigment. Pre-filtering preferably continues until the viscosity of mass 22 has substantially increased, for example, to between one and 50 poises. Although filtration can continue throughout the entire polymerization cycle if desired, the increasing power required to drive pump 36 renders the process less and less economical as viscosity increases.

With polymerizing nylon 66 according to the Example in the above-noted Hoff patent, the viscosity of mass 22 has been observed to increase slowly throughout the polymerization cycle until the autoclave pressure has been reduced to about 50 p.s.i.g., and to increase rapidly thereafter. In the early stages of polymerization when viscosity is low and mass 22 is vigorously boiling, the autoclave approximates a well-stirred tank. Under these conditions, circulating three times the volume of mass 22 through pre-filter 38 will remove about 95 percent of the agglomerates in autoclave 22 larger than the filter rating. As the viscosity increases, the autoclave becomes increasingly less similar to a well-stirred tank, and the effectiveness of circulating a given volume of liquid through pre-filter 38 decreases. However, the rate of agglomeration of pigment particles also decreases as the viscosity increases, and the need for further pre-filtration is thus less at higher viscosities.

One convenient point for discontinuing pre-filtering in an autoclave process is when an amount of water has been removed equal to the amount of water of solution in the original salt fed to the autoclave. This occurs with nylon-66 in the usual autoclave process at a temperature of 237°C., and mass 22 at this point has a viscosity of about two or three poises. If more thorough pre-filtration is desired, pre-filtration can be discontinued at about the time that the autoclave pressure reduction cycle begins, at which time the viscosity will be somewhat less than 50 poises in the usual polymerization cycle. Ordinarily little is to be gained by continuing pre-filtration beyond this point, although the viscosity increases slowly until the pressure has been reduced to about 50–100 p.s.i.g., after which point the viscosity increases much more rapidly. However some of the advantages of the invention will still be obtained up to about 400 poises, since the service life of the subsequent spinning filter will be increased, resulting in increased productivity of the spinning machine.

These considerations permit removal of the great majority of agglomerates even if pre-filtering is discontinued before the viscosity reaches high levels. Since effective results can be achieved without handling high viscosity materials, pumps of high precision are not required. Pre-filters with fine nominal ratings (average pore diameter ratings) can be used without requiring excessive pumping pressures at reasonably large throughput rates. Ordinarily the nominal rating will be less than 25 microns. The preferred nominal rating is no larger than 1/6 the diameter of the final drawn filament which is to be formed from the polymer. However, larger nominal ratings can be successfully used since any particles removed by the pre-filter correspondingly reduce the load on and increase the service life of the spinning filter.

The invention can also be applied to continuous polymerization processes. FIG. 3 shows the invention as applied to apparatus more fully disclosed in U.S. Pat. No. 2,689,839 to Heckert. Salt solution contained in vessel 52 is forwarded by pump 54 to the inlet of pipe 56 and fed into flash tube 58. The delusterant or pigment is introduced by pipe 60 into the low molecular weight material for mixing therewith as disclosed in the above-identified Heckert patent. From flash tube 58, the increasingly polymerized mass passes through flash tubes 62 and 64 of successively larger diameters before entering into finisher 66. The finished polymer exiting from finisher 66 through line 68 is metered by metering pump 70 and forced through spin filter 72 just prior to extrusion as molten streams through orifices in spinneret plate 74. Normally several spinning positions with their associated metering pumps will be fed from a single finisher 66. The molten streams are conventionally cooled and solidified, and collected in an orderly fashion by the usual means (not shown).

According to the invention, pre-filter 76 is installed in series with the fluid flow at a point where the liquid viscosity is relatively low. The location of pre-filter 76 is preferably at a point where the ionic character of the polymerizing mass has substantially disappeared. Likewise, pre-filter 76 is preferably located at a point where the polymerizing mass still has a relatively low viscosity.

In the continuous polymerization process illustrated in FIG. 3, all of the polymerizing mass flows through pre-filter 76. Advantageously, a second pre-filter 76 may be provided in parallel with the pre-filter illustrated, together with associated valves permitting operation on either pre-filter alone while the remaining pre-filter is isolated for cleaning or overhaul. Provision of such valving is within the scope of one skilled in the art and accordingly is not illustrated. Pre-filter 76 can be of conventional construction such as noted above with respect to pre-filter 38.

Although the pigment has been above specifically disclosed as added to the polymerizing mass after the mass has begun boiling, the major advantages of the present invention can be achieved if the pigment is added to an earlier or a later stage, provided that the pre-filtration step is performed on the polymerizing mass before the viscosity has increased to high levels.

While the invention has been specifically disclosed as applied to particular nylon-66 processes and apparatus, in its broader aspects it is applicable to other specific processes and to other polymers.

What is claimed is:

1. A polymerization process comprising:
    a. introducing polymerizable material having a viscosity less than 400 poises and finely divided pigment into a polymerization vessel, said pigment tending to form agglomerates under polymerizing conditions;
    b. maintaining polymerizing conditions in said vessel; and
    c. while polymerization is proceeding and before the viscosity of said material exceeds 400 poises:
        1. pre-filtering at least a portion of said material through a pre-filter having a given rating for removal of agglomerates larger than said rating, and 2. continuing polymerization of said filtered portion.

2. The process defined in claim 1, wherein said polymerizing conditions includes boiling said polymerizable material, and wherein said pigment is injected after said polymerizable material has begun boiling.

3. The process defined in claim 1, wherein said pigment is injected before the viscosity of said material has exceeded 3 poises.

4. The process defined in claim 1, wherein said polymerizable material includes water of solution, and wherein said pigment is injected after said polymerizable material has come to a boil and before an amount of water equal to the water of solution has evaporated.

5. The process defined in claim 1, wherein said pre-filter removes increasingly smaller agglomerates in the direction of fluid flow.

6. The process defined in claim 1, wherein said pre-filter removes at least some agglomerates having a size less than 25 microns.

7. The process defined in claim 1, wherein:
a. said process is a batch process; and
b. said portion is withdrawn from said vessel, fed through said pre-filter, and returned to said vessel for further polymerization.

8. The process defined in claim 7, wherein the total volume of polymerizing material circulated through said pre-filter is greater than the volume of said vessel.

9. The process defined in claim 1, further comprising:

a. metering said polymer through a spin filter and a multiple orifice spinneret plate to form molten filaments;
b. and solidifying said molten filaments to form solid filaments having diameters at least six times the nominal rating of said pre-filter.

10. The process defined in claim 1, wherein the step of pre-filtering is carried out before the viscosity of said material exceeds 50 poises.

11. A polymerization process comprising:
a. introducing an aqueous solution of the salt of hexamethylene diamine and adipic acid and finely divided pigment into a polymerization vessel, said solution having a viscosity less than 400 poises, said pigment tending to form agglomerates under polymerizing conditions;
b. maintaining polymerizing conditions in said vessel; and
c. while polymerization is proceeding and before the viscosity of said material exceeds 400 poises:
1. pre-filtering at least a portion of said material through a pre-filter having a given rating for removal of agglomerates larger than said rating; and
2. continuing polymerization of said filtered portion.

* * * * *